United States Patent
Hanson

[19]

[11] Patent Number: 6,038,679
[45] Date of Patent: Mar. 14, 2000

[54] ADAPTIVE DATA RECOVERY METHOD AND APPARATUS

[75] Inventor: Bradley Ellsworth Hanson, Rochester, Minn.

[73] Assignee: International Business Machines Corporation, Armonk, N.Y.

[21] Appl. No.: 08/346,689

[22] Filed: Nov. 30, 1994

[51] Int. Cl.[7] .................................................. G06F 11/00
[52] U.S. Cl. .................................. 714/5; 714/15; 714/774
[58] Field of Search .............................. 395/575, 182.03, 395/182.04, 182.13, 182.14; 371/41; 714/5, 6, 15, 16, 774

[56] References Cited

U.S. PATENT DOCUMENTS

| | | | |
|---|---|---|---|
| 3,668,631 | 6/1972 | Griffith | 340/146.1 A X |
| 3,896,416 | 7/1975 | Barrett et al. | 340/146.1 AL |
| 4,516,165 | 5/1985 | Cunningham et al. | 360/53 |
| 4,561,095 | 12/1985 | Khan | 371/38 |
| 4,654,853 | 3/1987 | Moriyama | 371/41 |
| 4,821,125 | 4/1989 | Christensen | 360/31 |
| 4,866,712 | 9/1989 | Chao | 371/5.1 |
| 4,993,030 | 2/1991 | Krakauer et al. | 371/40.1 |
| 5,068,858 | 11/1991 | Blaum | 371/41 |
| 5,189,566 | 2/1993 | Christensen et al. | 360/53 |
| 5,331,476 | 7/1994 | Fry | 360/53 |
| 5,379,162 | 1/1995 | Cunningham | 360/53 |
| 5,379,305 | 1/1995 | Weng | 371/41 |
| 5,430,743 | 7/1995 | Marturano | 371/43 |
| 5,432,787 | 7/1995 | Chethik | 370/79 |
| 5,444,719 | 8/1995 | Cox | 371/41 X |
| 5,450,579 | 9/1995 | Johnson | 395/182.14 X |
| 5,490,149 | 2/1996 | Nylander-Hill | 395/182.03 |

FOREIGN PATENT DOCUMENTS

| | | |
|---|---|---|
| 0188271 | 7/1986 | European Pat. Off. . |
| 0306196 | 3/1989 | European Pat. Off. . |
| 1-108818 | 4/1989 | Japan . |
| 429424 | 12/1974 | U.S.S.R. . |

*Primary Examiner*—Dieu-Minh T. Le
*Attorney, Agent, or Firm*—Mark A. Hollingsworth; Brian H. Batzli

[57] ABSTRACT

A data storage system is adapted for performing a plurality of data recovery procedures and data recovery routines. A selection switch is provided for manually selecting the plurality of data recovery procedures and routines preferably stored in, and performed by, a controller disposed in the data storage system. Alternatively, a host computer system, coupled to the data storage system, preferably produces a selection code instructing the data storage system to perform selected data recovery procedures and routines. Automatic execution of selected data recovery procedures and routines is facilitated by a controller in the data storage system which determines the type of data stored on the data disk, and executes selected data recovery procedures and routines upon detection of a read error in accordance with the determined type of the affected data.

2 Claims, 12 Drawing Sheets

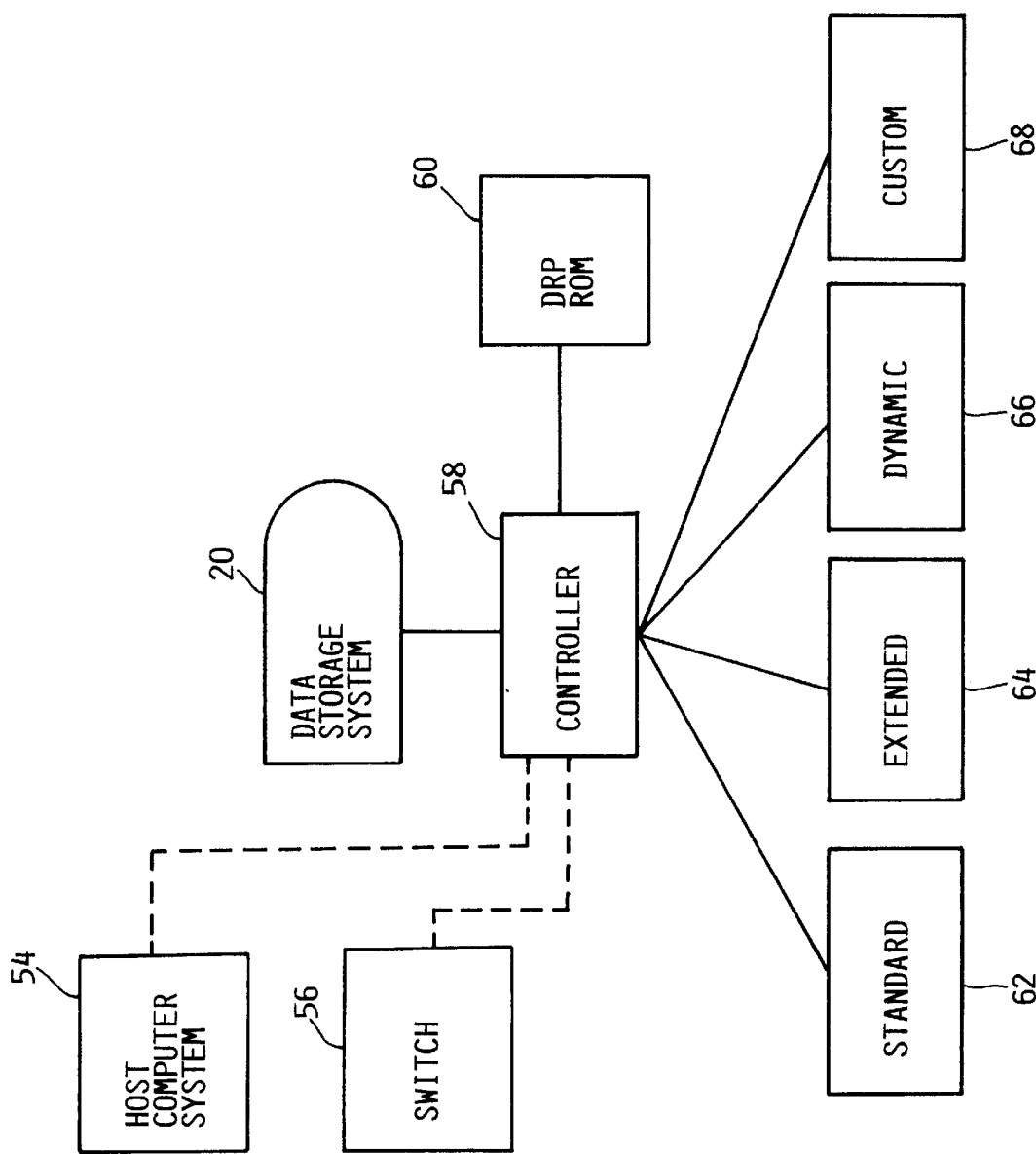

ADAPTIVE DATA RECOVERY METHOD AND APPARATUS

FIELD OF THE INVENTION

The present invention relates generally to data storage systems, and more particularly, to a data storage system adapted for selectively performing a plurality of data recovery procedures and routines.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and are passed over the surface of the rapidly rotating disks.

The actuator typically includes a plurality of outwardly extending actuator arms with one or more transducers being mounted resiliently or rigidly on the extreme end of the actuator arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a single transducer element used to both write data to the disks and read data from the disks. Other transducer configurations incorporate a read element and a write element.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical pulses in the read element. The electrical pulses represent transitions in the magnetic field.

Accurately positioning the transducers over the appropriate track and sector location is generally of critical importance, as any appreciable degree of actuator or transducer shifting may result in read and/or write errors of varying severity. Further, physical defects in the magnetic surface of the disk often result in an inability to read data previously written to the affected region of the disk, and often results in an unrecoverable loss of data.

Data storage systems typically employ hardware and software dedicated to detecting and correcting errors arising when reading data from a data storage disk. Errors detected while data is being read from the disk are generally categorized as soft read errors and hard read errors. Soft read errors are generally understood in the art as errors which are capable of being corrected by a data recovery procedure without adversely effecting the operation of the data storage system or the computer system to which the data storage system is coupled. Soft read errors are often imperceptible to the user of the computer system. An uncorrectable soft read error is generally termed a hard read error. The inability of the data storage system to locate specific data on the disk is also regarded as a hard read error. Hard errors are generally associated with a permanent loss of user data that was previously written to the disk. It is thus desirable to implement a data recovery strategy to avoid such hard read errors.

A data recovery procedure is generally executed by the data storage system upon detection of a read error that could not otherwise be corrected using limited error correction codes (ECC) which are typically encoded as part of the affected data. It is generally understood that the embedded error correction codes enable the data storage system to correct only relatively minor or non-complex read errors. As illustrated in FIG. 4, a conventional data recovery procedure 21 typically comprises a predefined set of data recovery routines 29. Each data recovery routine typically performs a series of operations or processing steps directed to correcting the read error. The data recovery routines are performed serially, or in ordered succession, in an attempt to recover the data affected by the soft read error. U.S. Pat. Nos. 5,189,566 and 4,516,165, held by the Assignee of the present application and incorporated herein by reference, disclose several procedures for recovering data subject to various types of read errors. These and other known data recovery procedures, when invoked, typically attempt to remedy soft read errors by sequentially performing a fixed number of data recovery steps or routines without regard to the nature of the read error encountered or the type of data subjected to the recovery procedure.

By way of example, as illustrated in FIG. 4 and discussed generally in U.S. Pat. No. 5,189,566, a data recovery routine-A 31 is initially performed when the data recovery procedure 21 is invoked. If routine-A 31 fails to remedy the read error, routine-B 33 is performed. Routine-C 35 is then initiated upon the failure of routine-B 33 to correct the read error, with subsequent data recovery routines being sequentially performed until a data read is successfully performed or the sequential list of data recovery routines comprising the data recovery procedure 21 is exhausted without having rectified the read error. Failure of the data recovery routines 29 to correct a read error results in a hard read error condition in which the affected data is typically unrecoverable by the user of the data storage system. Such hard read errors may ultimately be recoverable, but only after returning the data storage system to a factory for repair, or by a system technician executing one or more time-consuming, specialized diagnostic procedures.

The overall performance of a data recovery procedure is generally understood as a measure of the speed at which the data recovery procedure operates and the effectiveness of the recovery procedure to correct a read error. Although it is desirable that a data recovery procedure correct read errors both quickly and effectively, the time allotted for performing a data recovery procedure is typically limited in order to avoid any adverse interruption in the operation of a computer system to which the data storage system is coupled. Such maximum time limitations are generally specified by the computer system manufacturer and monitored by the host computer system. An increase in the speed at which a data recovery procedure operates generally has the adverse result of reducing the overall effectiveness of the recovery procedure in order to guarantee completion of the procedure within a specified period of time. Similarly, a higher level of data recovery effectiveness generally provides a higher degree of data integrity, but results in decreased processing speeds.

In order to guarantee completion of a data recovery procedure within a specified time period, the number of recovery operations and complexity of the recovery procedure must typically be reduced, thereby resulting in a decrease in data recovery effectiveness. Yet, the maximum allowable hard read error rates specified by the purchasers of data storage systems, typically computer system manufacturers, continue to become more stringent, often requiring more and complex procedures to rectify read errors. Manufacturers of data storage systems are thus finding it difficult to meet both speed and recovery effectiveness requirements for customers specifying increasingly shorter data recovery time periods.

The type of information stored in data storage systems, as well as the processing environment, typically varies widely among the users of computer and data storage systems. Data recovery needs, consequently, are generally diverse as well. By way of example, the accuracy and reliability of transactional data is of critical importance in the finance and banking marketplace, while the overall processing speed of a data recovery procedure is generally of secondary importance. Banking and savings institutions, for example, typically require that all electronic transactions be performed with a high degree of accuracy and reliability. Telephonic transfer of funds, for example, must be accomplished without error to ensure that the specified amount of transfer and identity of the transferor and transferee accounts be accurate. A data storage system manufacturer must typically develop an appropriate data recovery strategy to ensure a high level of data integrity at the expense of processing efficiency. For customer environments in which data integrity is of critical importance, a data storage system manufacturer will generally design and manufacture a data storage system that provides a highly effective, but relatively slow, data recovery capability.

Other customers and markets may require a data system manufacturer to develop data storage systems and data recovery procedures designed for operation in environments in which data transfer and read error correction speed is of primary concern. A video file server, for example, may comprise one or more data storage disks onto which digitized audio and video information is stored for future reception and presentation by an end-user. Occasional read errors may result in a minor degradation in the video or audio presentation, but may be imperceptible to the observing end-user. A few unrecoverable data bits from a disk containing digital audio, for example, may not be perceptible to the human ear. Any substantial delay in the presentation of either the audio or video program during playback, however, will be readily noticeable, either as a freezing of the video presentation, or as signal dropout during the audio presentation. In such an operating environment, the processing speed of the data storage system and data recovery procedure is of critical importance, while the efficacy of the data recovery procedure is generally of secondary importance. An appropriate data recovery procedure for such an environment should provide a nominal level of recovery effectiveness at a guaranteed processing speed in order to avoid any undesirable delay in the transfer of data from the data storage system.

It can be appreciated, that in a high-volume, cost-sensitive manufacturing environment, the production of specially designed and manufactured data storage systems having data recovery capabilities usable only within specific markets generally results in increased production costs, complicates inventory procedures, and often results in over-stocking of one or more data storage system models needed to anticipate changes in sales within a spectrum of marketplaces. Moreover, the manufacturers of data storage systems are generally finding it increasingly difficult to meet both the speed and data recovery effectiveness requirements specified by customers having varying data storage needs and operating environments.

SUMMARY OF THE INVENTION

The present invention is a data storage system adapted for performing a plurality of data recovery procedures and routines for correcting errors occurring when reading data from a data storage disk. One or more data recovery procedures and routines may be selected manually by appropriately configuring a selection switch mounted to the data storage system. Alternatively, a host computer system, coupled to the data storage system, preferably produces a selection code which instructs the data storage system to perform selected data recovery procedures and routines when correcting read errors. Automatic execution of selected data recovery procedures and routines is facilitated by a controller disposed in the data storage system which determines the type of data stored on the data storage disk, and executes selected data recovery procedures and routines to effectively correct read errors for each type of data stored on the data storage disk. A host computer system may communicate to the controller of the data storage system a signal indicative of the type of data to be written to the data storage disk.

BRIEF DESCRIPTION OF THE DRAWINGS

FIG. 6 is a generalized block diagram of a novel data storage system configured to perform a plurality of selectable data recovery procedures for adapting to a plurality of operating environments;

DETAILED DESCRIPTION OF THE PREFERRED EMBODIMENTS

Figure 1:
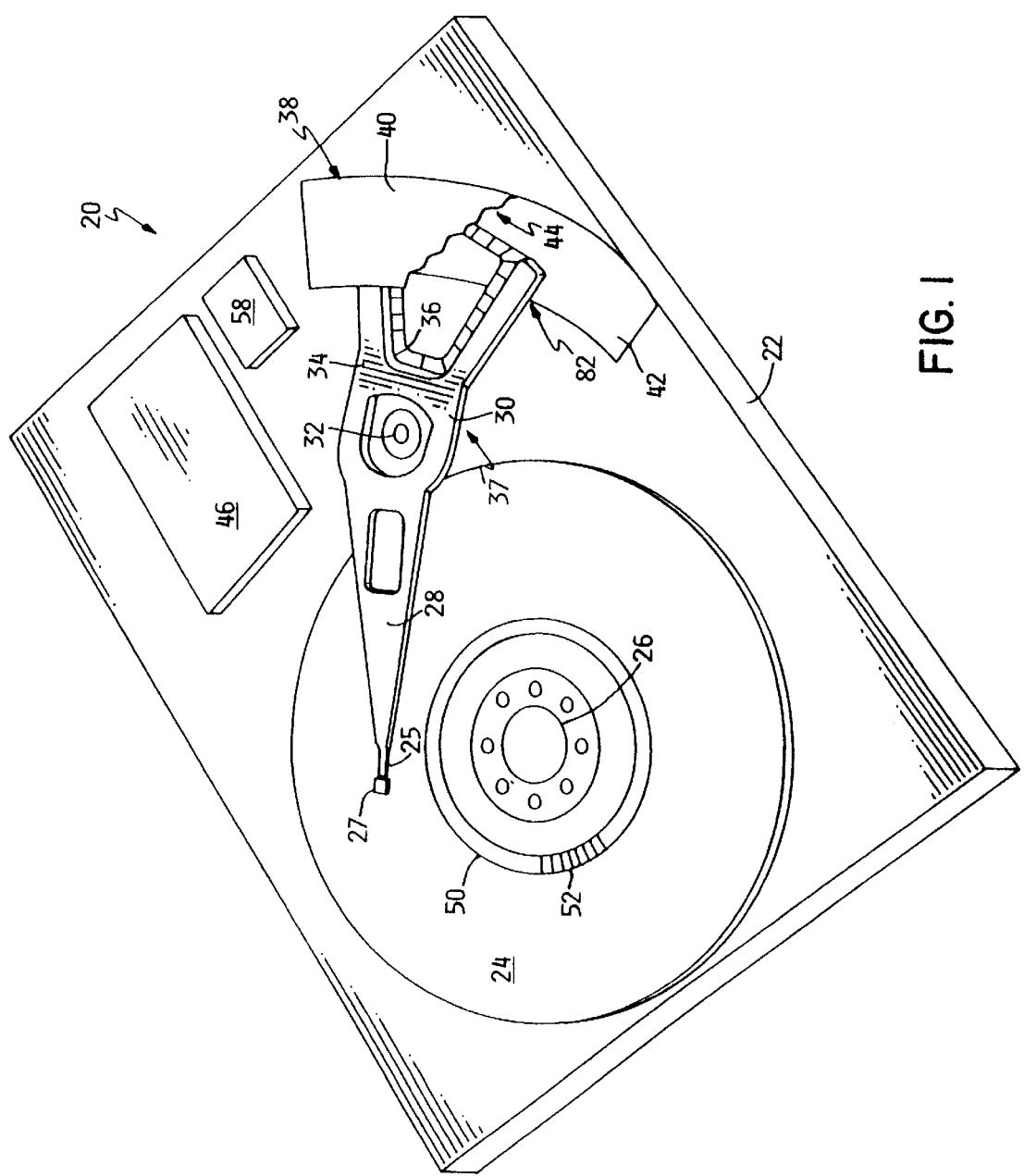
FIG. 1 is a top perspective view of a data storage system with its upper housing cover removed, and adaptable for performing a plurality of data recovery procedures and data recovery routines.
Figure 2:
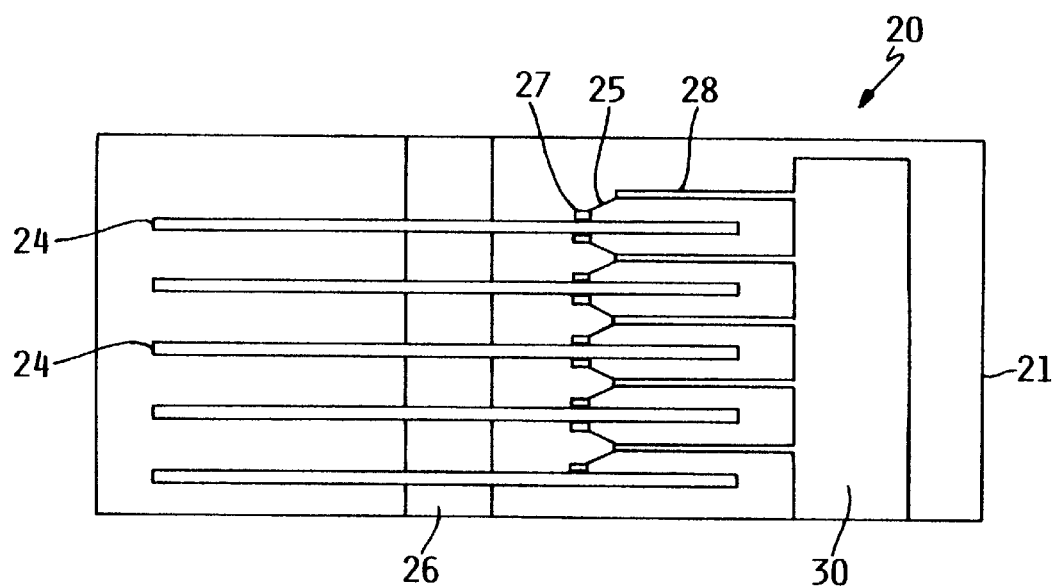
FIG. 2 is a side plan view of a data storage system comprising a plurality of data storage disks, and adaptable for performing a plurality of data recovery procedures and data recovery routines.
Figure 5:
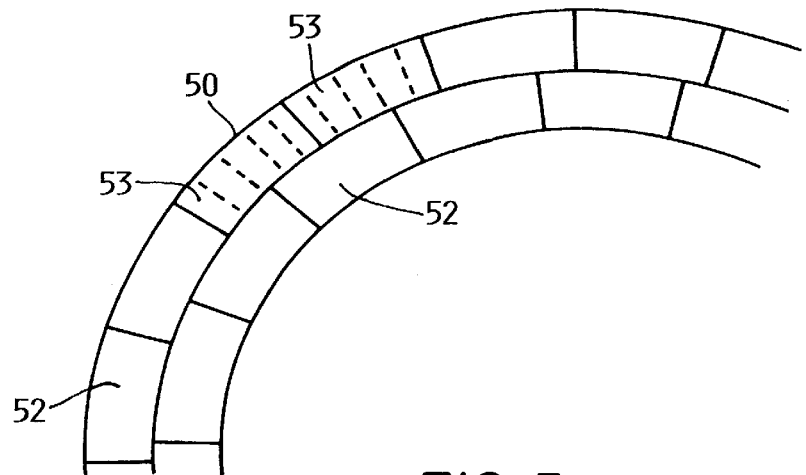
FIG. 5 is an illustration of a conventional track configuration for a data storage disk, with each track comprising a plurality of sectors and information fields.

Referring now to the drawings, and more particularly to FIGS. 1 and 2, there is shown a data storage system 20 adaptable for performing a plurality of data recovery procedures and routines to correct read errors arising when reading data from the data storage disks 24. The components of the data storage system 20 are shown mounted on a housing base 22, with the housing cover removed from the base 22. The data storage system 20 typically includes one or more rigid data storage disks 24 which are stacked coaxially in a tandem spaced relationship, and rotate about a spindle motor 26 at a relatively high rate of rotation. Each disk 24, as shown in FIG. 5, is typically formatted to include a plurality of spaced concentric tracks 50, with each track being partitioned into a series of sectors 52 which, in turn, are further divided into individual information fields 53. One or more of the disks 24 may alternatively be formatted to include a spiralled track configuration.

An actuator 30 typically includes a plurality of interleaved actuator arms 28, with each arm having one or more transducers 27 mounted to a load beam 25 for reading and writing information onto the data storage disks 24. The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surfaces of the data storage disks 24. The spindle motor 26 typically comprises a poly-phase, a.c. motor or, alternatively, a d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 82 responsive to control signals produced by a controller 58. The actuator voice coil motor 82 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuitry that coordinates the transfer of data to and from the data storage disks 24, and cooperates with the actuator voice coil motor 82 to move the actuator arms 28 and transducers 27 to prescribed track 50 and sector 52 locations when reading and writing data to the disks 24.

Turning now to FIG. 6, there is illustrated a novel data storage system 20 adapted for selectively performing a plurality of data recovery procedures and data recovery routines. A controller 58, coupled to the data storage system 20, preferably coordinates the transfer of data to and from the data storage disks 24 provided within the data storage system 20, and performs selected data recovery procedures and routines to correct errors arising when reading data from the disks 24. In one preferred embodiment, a switch 56, coupled to the controller 58, provides a data storage system manufacturer, computer system manufacturer, or end-user with the capability to manually select data recovery procedures and routines for performing read error correction best suited for particular types of data and operating environments. In another preferred embodiment, a host computer system 54 is coupled to the data storage system 20 and produces a selection code indicative of selected data recovery procedures and routines for performing read error detection and correction. In an alternative preferred embodiment, the data storage system 20 automatically performs specific data recovery procedures and routines depending on the type of data stored on the disks 24.

In one embodiment, the controller 58 includes data recovery procedure (DRP) circuitry capable of performing a plurality of data recovery procedures and routines. The controller 58 preferably includes a memory device sufficient in capacity and functionality to facilitate storage and selective execution of a plurality of data recovery procedures and routines. Various known memory devices suitable for employment in the DRP circuitry include gate arrays, read-only-memories (ROMs), programmable array logic (PALs), and other combinational logic and memory devices. The controller 58 may further include an internal or external microcontroller or microprocessor with supporting firmware or microcode programmed to perform selected data recovery procedures and routines.

In another embodiment, the novel data storage system 20 preferably includes a data recovery procedure read-only-memory (DRP ROM) module 60 for storing a plurality of data recovery procedures and routines. The DRP ROM module 60 may be a sub-system integrally included within the controller 58 or an external device coupled to the controller 58. By appropriately configuring the switch 56, or by receiving a selection code produced by the host computer system 54, the controller 58 preferably executes the selected data recovery procedures and routines stored in the DRP ROM 60.

In one configuration, the DRP ROM 60 preferably comprises a detachable memory module which may be easily coupled to and uncoupled from the controller 58. One of a number of known connector configurations may be employed to detachably couple the controller 58 to the DRP ROM module 60. In accordance with this embodiment, the detachable DRP ROM module 60 may be programmed to include a variety of data recovery procedures and routines, and preferably comprises a memory architecture amenable to easy erasure and reprogramming. A popular alterable memory technology suitable for application in the DRP ROM module 60 is electrically erasable programmable read-only-memory (EEPROM). The detachable DRP ROM module 60 thus provides a purchaser of the data storage system 20 with the capability to conveniently upgrade existing data recovery procedures and routines or include new data recovery procedures and routines simply by removing an existing DRP ROM module 60 and coupling to the controller 58 a newly reprogrammed DRP ROM module 60 received from the manufacturer of the data storage system 20, for example.

In an alternative configuration, the plurality of data recovery procedures and routines may be stored on a data storage disk 24 of the data storage system 20. Selected procedures and routines are preferably downloaded to the controller 58 upon initial power-up of the data storage system 20. In this embodiment, a purchaser of the data storage system 20 may upgrade existing or add new data recovery procedures and routines to the data storage system 20 simply by transferring the new data recovery programs from a floppy diskette received from the manufacturer to the data storage disk 24 of the data storage system 20.

Figure 3:
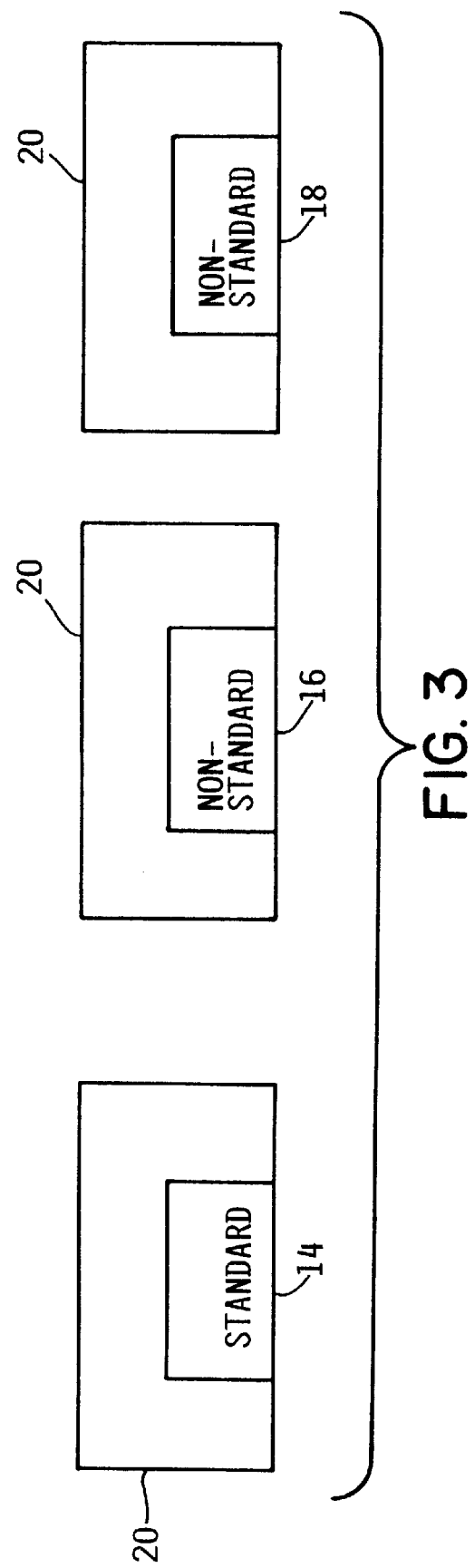
FIG. 3 is an illustration of several prior art data storage systems, with each system provided with a single data recovery procedure designed for employment in a particular operating environment.
Figure 4:
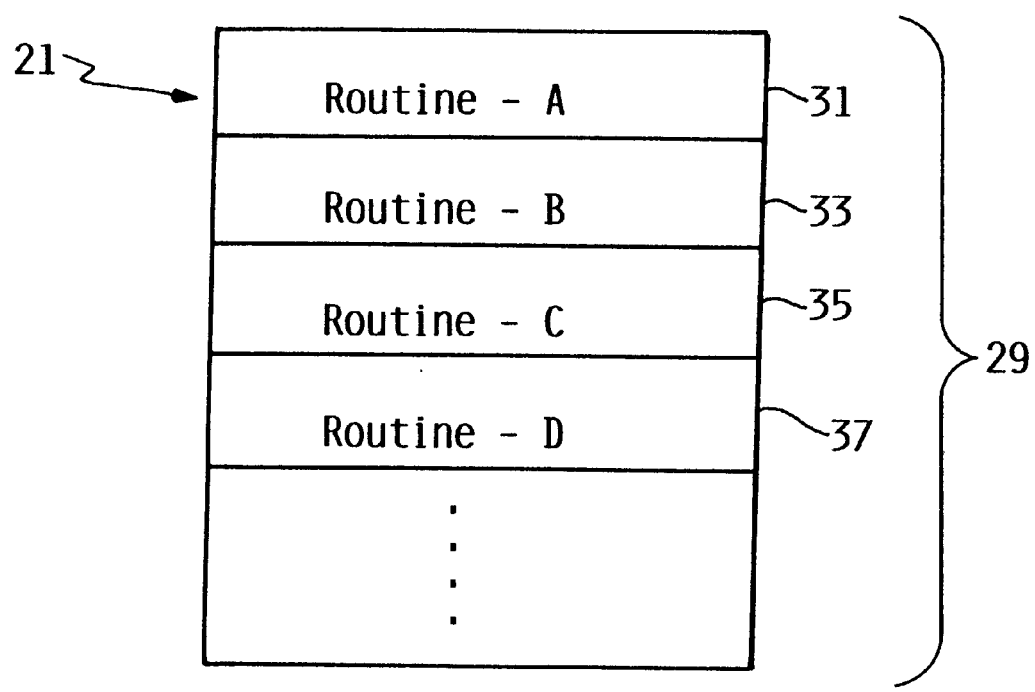
FIG. 4 is an illustration of a prior art data recovery procedure comprising a plurality of data recovery routines arranged for sequential execution.

The novel data storage system 20 provides a user of the data storage system 20 with the flexibility of tailoring a data recovery strategy for a particular operating environment and type of data to be stored in the data storage system 20. A computer system manufacturer, for example, may manufacture a variety of computer system models that process a variety of data types, including alphanumeric, audio, video, graphical, and other multi-media information. One approach to providing a data recovery procedure best suited to each unique data type and operating environment is illustrated in FIG. 3. Each of the three data storage systems 20 depicted in FIG. 3 employ a single conventional data recovery procedure 14, 16, or 18 adapted for operation in accordance with a user's specific data storage requirements. The present invention, in contrast, provides a single data storage system 20 capable of selectively performing a plurality of data recovery procedures and routines in accordance with a purchaser's unique data storage requirements and operating environment.

In the embodiment illustrated in FIG. 6, the controller 58 is adapted to perform one of four data recovery procedures stored either in the controller 58, the DRP ROM module 60, or on a data storage disk 24 of the data storage system 20. It is to be understood that the data recovery procedures illustrated in FIG. 6 are provided for illustrative purposes only, and do not represent a limitation on the number and type of data recovery procedures executable by the controller 58 of the data storage system 20. Each of the four data recovery procedures 62, 64, 66, and 68, in turn, comprise a plurality of data recovery routines. The adaptive data recovery scheme of the novel data storage system 20 permits selection of any one of the four data recovery procedures 62, 64, 66, and 68, any or all of the data recovery routines comprising the selected data recovery procedure, or any combination of the data recovery procedures and routines. It is noted that the data recovery routines for a particular data recovery procedure may have a pre-established order of operation which may be modified by appropriately selecting a preferred order for data recovery routine execution.

A user of the data storage system 20 may select data recovery procedures and routines best suited for performing error correction for specific types of data. A standard data recovery procedure 62, for example, may be selected for performing error correction for alphanumeric data stored on the data storage system 20. The standard data recovery procedure 62 generally provides a balance of error correction speed and data recovery effectiveness. An extended data recovery procedure 64 may be selected by a user when data integrity and data recovery effectiveness is of greater importance than the overall processing speed of the data recovery procedure 64.

A user may select a dynamic data recovery procedure 66, for example, particularly suited for data storage environments where processing speed is considered a priority relative to the overall effectiveness of the data recovery procedure 66. In many multi-media applications, for example, audio and video information must generally be transferred from the data storage disk 24 to a host computer system 54 at a constant transfer rate. Any appreciable delay in the transferring of data from the data storage system 20 to the host computer system 54 may result in a noticeable delay in the presentation of the video or audio program. In general, a read error associated with multi-media data stored in the data storage system 20 typically results in only a minor degradation in the quality of the effected audio or video presentation. Many read errors are often imperceivable to the viewing observer. Moreover, various signal processing and smoothing techniques may be employed to enhance the audio and video presentation upon the occurrence of a hard read error, thereby making the hard error imperceivable to the viewer or listener.

The novel data storage system 20 may also include a custom data recovery procedure 68 specifically tailored to a customer's particular type of data or operating environment. In addition to other data recovery procedures selectively available, a custom data recovery procedure 68 may be provided for processing read errors to meet a customer's specific maximum allowable hard read error rate or to perform read error correction for a unique type of data stored in the data storage system 20.

Figure 7:
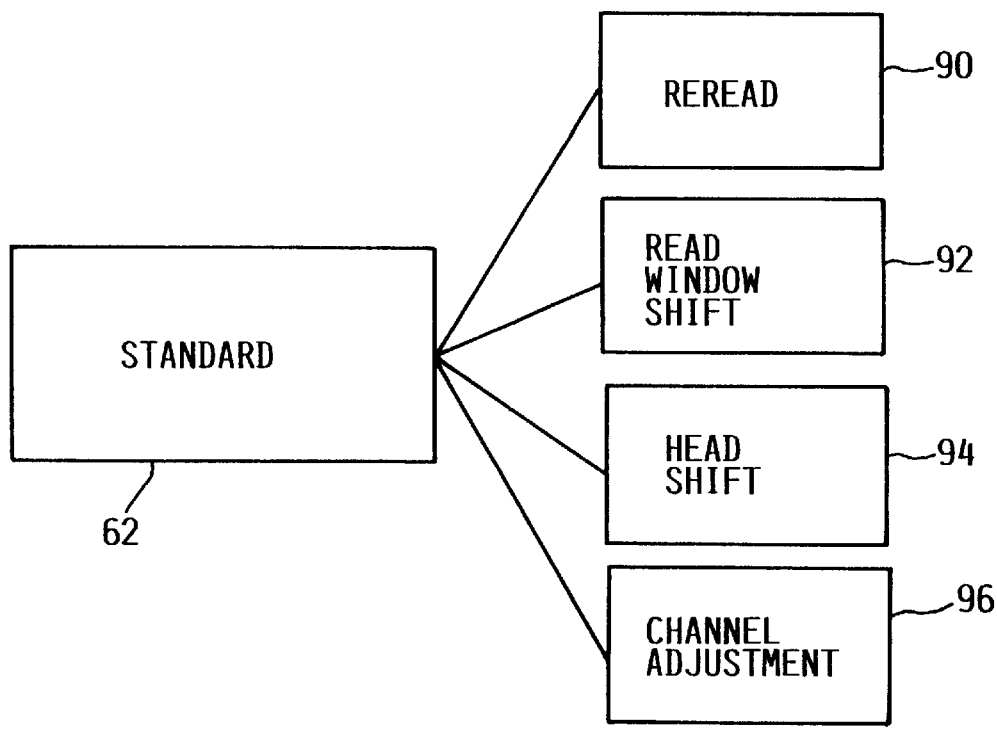
FIG. 7 is an illustration depicting a plurality of data recovery routines comprising a standard data recovery procedure employed in a novel data storage system adapted for performing a plurality of data recovery procedures and routines.
Figure 8:
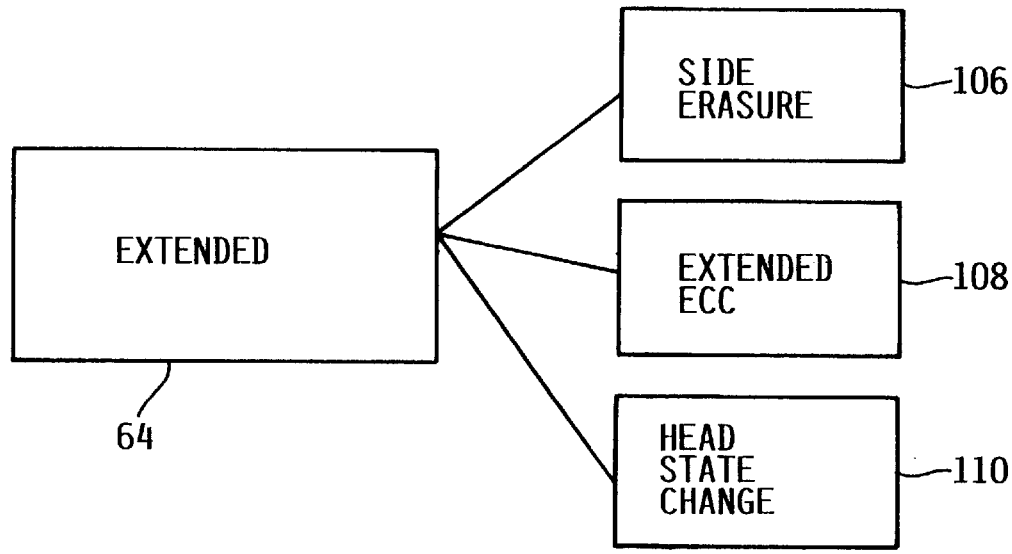
FIG. 8 is an illustrative showing of a plurality of data recovery routines comprising an extended data recovery procedure employed in a novel data storage system adapted for performing a plurality of data recovery procedures and routines.

Turning now to FIGS. 7 and 8, there is shown a plurality of data recovery routines comprising each of the standard and extended data recovery procedures 62 and 64. The standard data recovery procedure 62 preferably includes a number of standard data recovery routines generally known in the art, as well as other data recovery routines which are developed to meet the speed and recovery effectiveness requirements for most operating environments and data types. Typical standard data recovery routines known in the art and comprising the standard data recovery procedure 62 include a re-read routine 90, a read window shift routine 92, a head shift routine 94, and a channel adjustment routine 96. The extended data recovery procedure 64 illustrated in FIG. 8 preferably comprises a plurality of elaborate and specialized data recovery routines. A side erasure routine 106, an extended ECC routine 108, and a head state change routine 110 are three such extended data recovery procedures typically employed in an operating environment in which integrity of the data and data recovery effectiveness is of critical importance relative to the overall processing speed of the data recovery procedure.

Figure 9:
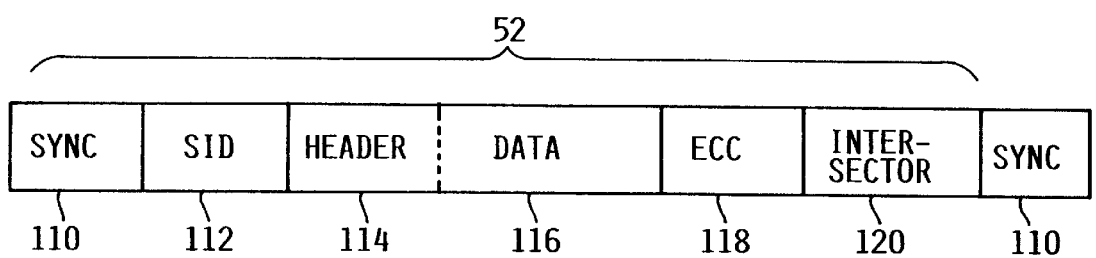
FIG. 9 is an illustration of the information fields comprising a sector of a data track provided on a data storage disk, including a header field for storing information regarding the type of data stored in the data field.

In another embodiment, selection and execution of particular data recovery procedures and routines is performed automatically by the data storage system 20. In a multimedia environment, for example, a combination of alphanumeric, audio, video, and graphical data may be stored on a single data storage disk 24 of the data storage system 20. Automatic determination of the particular type of data residing on the data storage disk 24 and execution of appropriate data recovery procedures and routines in response to a detected read error is provided by the cooperative operation of the novel data storage system 20 and the host computer system 54. As illustrated in FIGS. 5 and 9, each sector 52 of a track 50 preferably includes a number of information fields 53 having a predetermined structure and order. A synchronization (sync) field 110 is typically provided at the beginning of a sector 52 and contains information needed to properly synchronize the data channel as it reads data from the data storage disk 24. The sector identifier (SID) 112 provides information uniquely identifying the location of each sector 52 of the track 50. The actual data is stored in a data field 116 which is generally preceded by a header field 114.

The header field 114 preferably includes information regarding the type of data stored in the data field 116. Typical data types identified in the header field 114 include alphanumeric, video, audio, and graphical data. Error correction code (ECC) 118 information is generally used to detect the occurrence of errors arising when the data is read from the data storage disk 24. An intersector gap 120 is generally provided to prevent accidental erasure of data typically resulting from turning off current to the transducers 27 during a write procedure. It is understood that other information fields may be included in the sector 52, and that the fields comprising the sector 52 may be organized in a variety of formats. It is further understood that other track configurations may be employed, including one or more serpentine or spiralled track configurations, for example.

In practice, the data storage system 20 is generally installed in a host computer system 54, or alternatively, provided in an external housing and coupled to the host computer system 54. When writing data to the data storage disk 24, the host computer system 54 preferably encodes information in the header field 114 identifying the type of data stored in the data field 116. Any one of a number of known schemes may be employed to uniquely identify the type of data being transferred to the data disk 24. It is to be understood that data types other than those discussed herein may be stored in the data field 116 and identified in the header field 114 of the sector 52.

When reading data stored on the data storage disk 24, the header field 114 for each data field 116 is preferably read by the controller 58 of the data storage system 20. Should a read error occur when reading the data from the data field 116, the controller 58 preferably executes data recovery procedures and routines in accordance with the type of data stored in the data field 116. More specifically, the controller 58 preferably correlates the data-type information stored in the header field 114 to preferred data recovery procedures and routines associated with the type of data stored in the data field 116. A cross-reference or look-up table may be employed in the memory of the controller 58 for performing the correlation operation. Accordingly, the controller 58 provides for the automatic execution of appropriate data recovery procedures and routines based on the automatic determination of the data-type information contained within the header field 114 for each data field 116 stored on the data storage disk 24. As such, optimum read error correction and data recovery may be realized.

Figure 10:
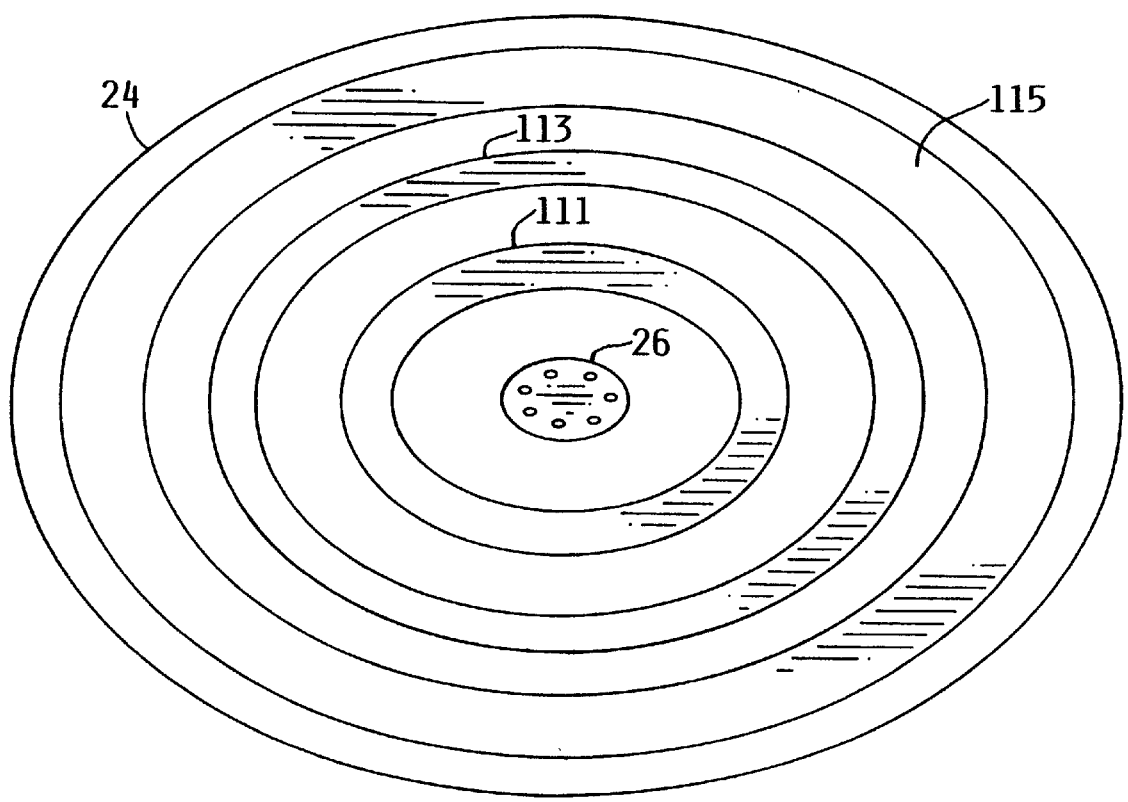
FIG. 10 is a showing of a data storage disk formatted to include a plurality of data bands for storing specific types of data therein.

The additional sector space needed to accommodate the header field 114 associated with each data field 116 typically reduces to some extent the total data storing capacity of a data storage disk 24. In the embodiment illustrated in FIG. 10, automatic determination of the type of data stored in the data field 116 of a particular sector 52 is accomplished without requiring the additional header field 114. The data storage disk 24 is preferably formatted to include a plurality of data bands dedicated for storing specific types of data. A video data band 115, for example, may span several hundred or thousand tracks 50 for storing video data, or comprise a single, continuous spiraled data track. An alphanumeric data band 113 may similarly be defined and dedicated for storing alphanumeric data. Other types of data may be stored in dedicated data bands distributed over the surface of the data storage disk 24. The controller 58 preferably includes a cross-reference table to store location information identifying the beginning and ending tracks and sectors for each data band. When data is read from a particular data band, the controller 58 determines which of the plurality of data recovery procedures and routines are to be performed when an error is detected while reading data from the data band. The particular data recovery procedures and routines associated with each type of data and data band are preferably pre-selected in a manner discussed hereinbelow.

Figure 11:
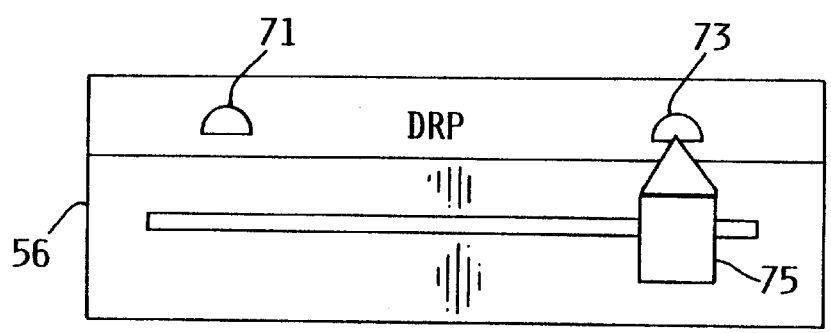
FIG. 11 is an illustration of a selection switch for a novel data storage system having a first and a second selection setting for respectively selecting a first and second data recovery procedure.
Figure 12:
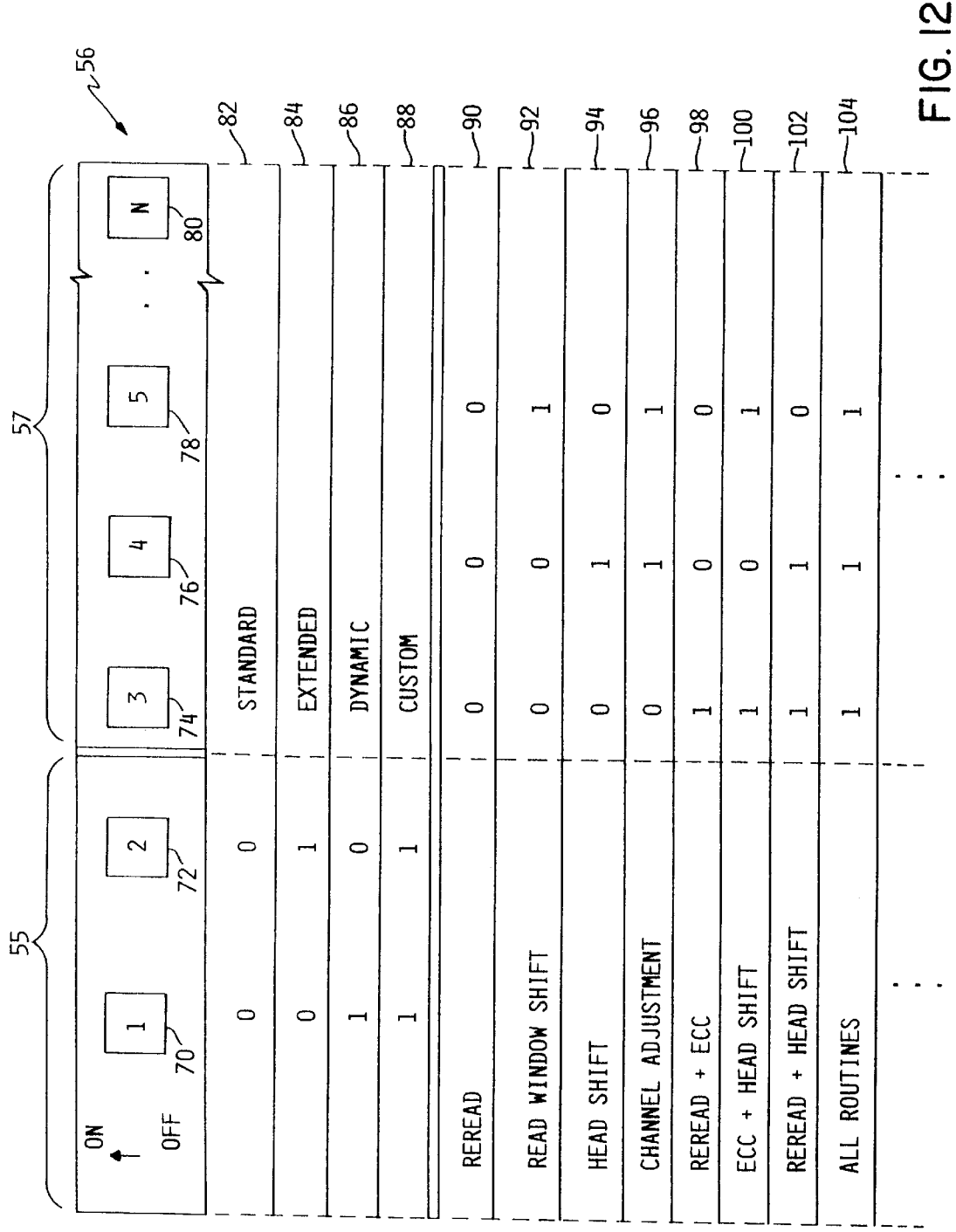
FIG. 12 is an illustration of a DIP switch coupled to a novel data storage system for manually selecting a plurality of data recovery procedures and data recovery routines.
Figure 13:
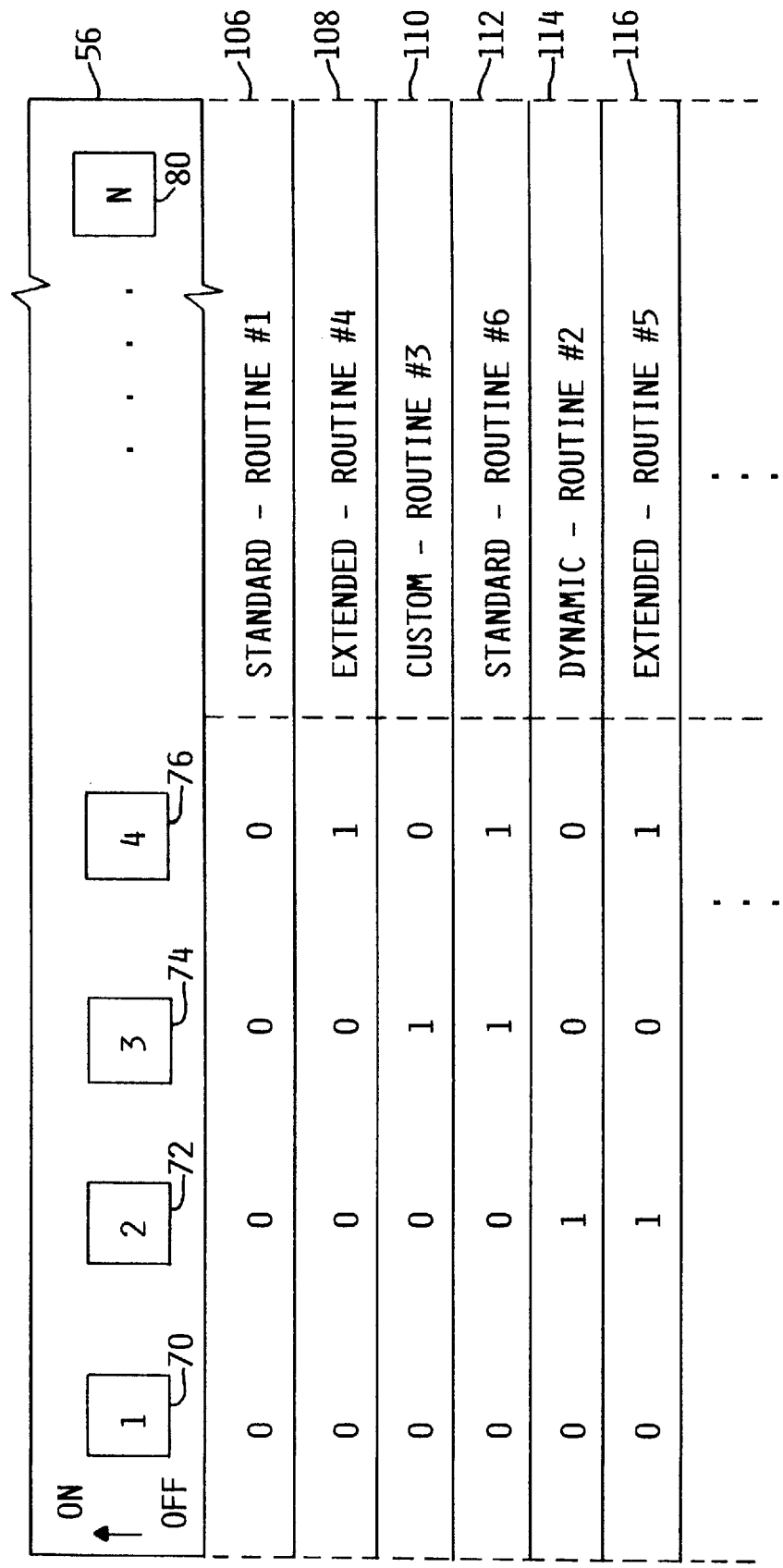
FIG. 13 is an illustration of an alternative DIP switch configuration for manually selecting and ordering a plurality of data recovery routines.

Turning now to FIGS. 11–13, there is shown various embodiments for manually selecting and ordering specific data recovery procedures and routines performed by the novel data storage system 20. A simple selection switch 56 is illustrated in FIG. 11 having a slide switch 75 and two settings 71 and 73 for respectively selecting one of two data recovery procedures. The switch 56 is preferably mounted to the housing 21 of the data storage system 20 and electrically coupled to the controller 58. In accordance with this embodiment, setting the slide switch 75 to the first setting 71 preferably enables operation of a standard data recovery procedure 62 upon detection of a read error. Moving the slide switch 75 to the second setting 73 preferably enables operation of an extended data recovery procedure 64 for correcting read errors. A single data storage system 20 may thus be adapted to perform one of two selectable data recovery procedures simply by moving the slide switch 75 between a first and second setting 71 and 73. Additional slide switch 75 settings may be provided on the switch 56 for selectively enabling other data recovery procedures.

Enhanced selection capability is provided in another embodiment by employment of a DIP switch 56 as illustrated in FIG. 12. The DIP switch 56 is shown as comprising a plurality of individual switches 70, 72, 74, 76, 78, and 80. Each of the switches comprising the DIP switch 56 respectively has an ON position and an OFF position. By appropriately setting the switches comprising the DIP switch 56 to either the ON or OFF position, specific data recovery procedures and routines may be selectively enabled and disabled. In the embodiment illustrated in FIG. 12, switches 70 and 72 operate in combination to provide data recovery procedure selection 55. Switches 74, 76, 78, and 80 operate in combination to provide data recovery routine selection 57. It is noted that an ON switch setting is indicated by the number "1," and an OFF switch setting is represented by the zero symbol "0."

Selection of a standard data recovery procedure 82, for example, may be accomplished by setting both switches 70 and 72 to the OFF position. The extended data recovery procedure may be enabled by setting the switch 70 to the OFF position and the switch 72 to the ON position. In a similar manner, the dynamic and custom data recovery procedures may be selected by appropriately setting the switches 70 and 72 to the appropriate ON and OFF positions. Selection of other data recovery procedures in addition to the four illustrated in FIG. 12 may be selected by dedicating an additional switch, such as switch 74, to cooperatively operate with switches 70 and 72 to provide selectively between more than four data recovery procedures.

In general, each of the data recovery procedures 82, 84, 86 and 88 includes one or more data recovery routines which may be enabled or disabled by appropriately setting switches 74, 76, and 78. In the event a first data recovery routine fails to correct a soft read error, other data recovery routines are typically performed until the soft read error is corrected. It may be desirable in some circumstances to enable and disable individual data recovery routines within the set of data recovery routines comprising a data recovery procedure. By appropriately setting switches 74, 76, and 78, the various data recovery routines comprising a selected data recovery procedure may be enabled or disabled as desired.

Enabling all data recovery routines comprising a selected data recovery procedure, for example, is accomplished by setting switches 74, 76, and 78 to the ON position. An individual data recovery routine, such as a head shift routine 94, may be enabled while disabling all other data recovery routines comprising the selected data recovery procedure by setting switches 74 and 78 to the OFF position and switch 76 to the ON position. Any combination of data recovery routines defined for a selected data recovery procedure may thus be enabled and disabled by appropriately selecting the switches 74, 76 and 78 as illustrated in FIG. 12. Additional data recovery routines and combinations of data recovery routines may be accommodated by providing one or more additional switches 80 to the DIP switch 56. Accordingly, a manufacturer of data storage systems, computer system purchaser, or end-user may optimize the data recovery capability of the data storage system 20 by selecting data recovery procedures and routines best suited for error detection and correction for particular types of data to be stored in the data storage system 20.

In the embodiment illustrated in FIG. 13, a DIP switch 56 is configured to provide selective enabling, disabling, and ordering of a plurality of data recovery routines without regard to specific data recovery procedures. For purposes of clarity and simplicity of explanation, however, it is assumed that the data recovery routines shown in FIG. 13 are initially organized for selection in numerical order according to each of the standard, extended, dynamic, and custom data recovery procedures. The data recovery strategy depicted in FIG. 13 provides successive execution of specific data recovery routines selected and organized in a preferred order by appropriately setting switches 70, 72, 74, and 76 between the ON and OFF positions. Any combination of data recovery routines may thus be enabled, disabled, and ordered to define a customized data recovery scheme tailored to meet the performance requirements for a plurality of data storage system 20 customers. A data storage system manufacturer may employ the disclosed novel adaptive data recovery method and apparatus within a single data storage system 20 to meet the speed, recovery effectiveness, and maximum allowable hard read error rates for a wide range of data types, operating environments, and customer requirements.

Figure 14:
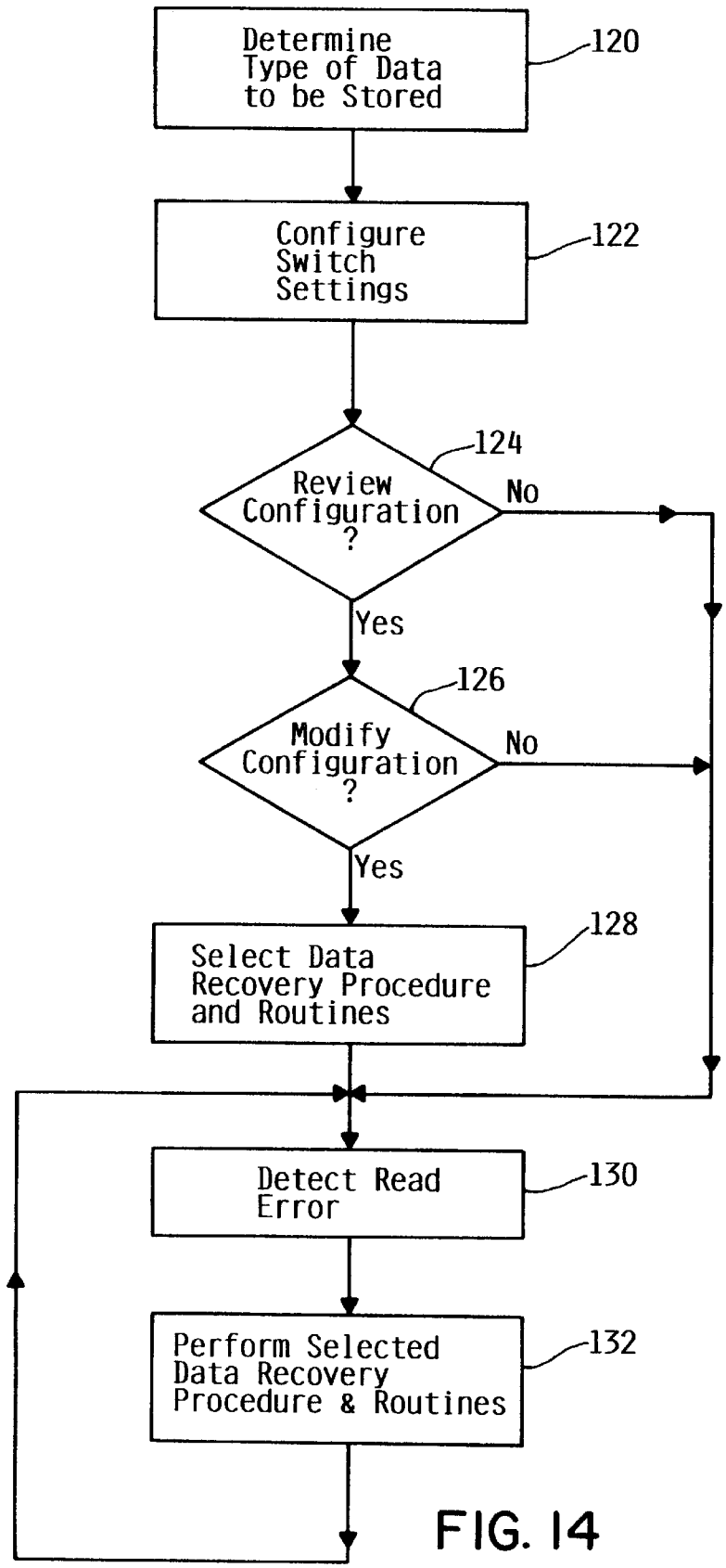
FIG. 14 is a generalized flow diagram of various process steps for manually implementing a novel adaptive data recovery process for a data storage system.
Figure 15:
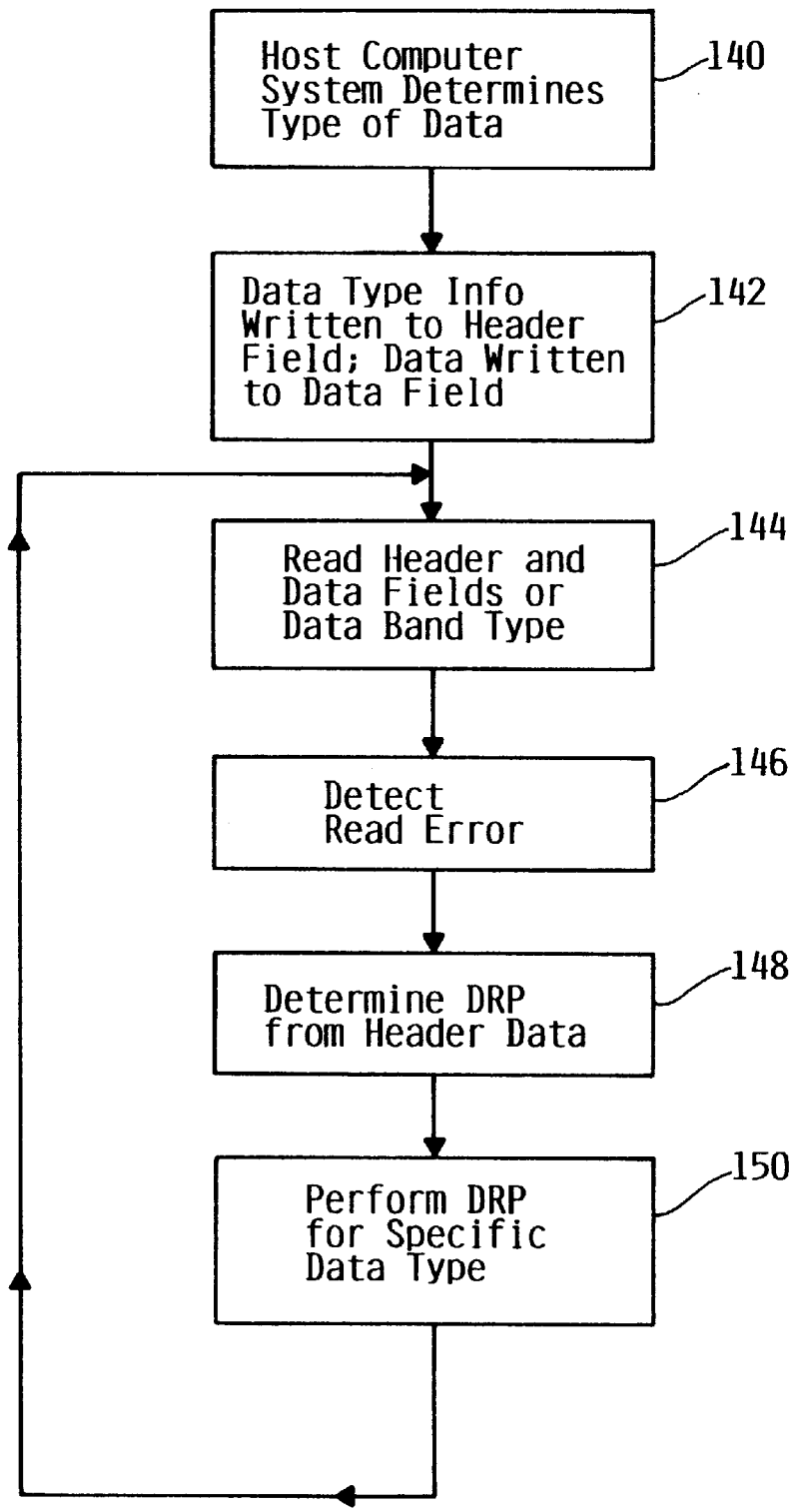
FIG. 15 is a generalized flow diagram of various process steps for automatically implementing a novel adaptive data recovery process for a data storage system.

In FIGS. 14 and 15, there is illustrated in block diagram form the general methodology by which a data storage system manufacturer, computer system manufacturer, or end-user may configure a data storage system 20 to optimize a data recovery strategy. An initial step 120 in the optimization process is to determine the type of data to be stored in the data storage system 20. The switch 56 may then be configured at step 122 to select desired data recover procedures and data recovery routines. In one embodiment, configuration software may be operated on an attached host computer system 54 for reconfiguring through software the effective settings of the switch 56. At step 124, for example, an end-user may review the configuration of the switch 56 and the selected data recovery procedures and routines. An end-user may modify the original switch 56 configuration, typically determined by the manufacture of either the data storage system or host computer system 54, by operating the configuration software and instructing the data storage system 20 to override or ignore the actual switch 56 settings in favor of the new settings effectively established through the configuration software at steps 126 and 128. The controller 58 preferably coordinates the transfer of data to and from the data storage disk 24, and detects any read errors that might arise during normal read operations at step 130. When the controller 58 detects a read error, the selected data recovery procedure and routines are executed to perform read error correction at step 132. Subsequent read transactions are monitored by the controller 58 at step 130.

In another embodiment, as illustrated in FIG. 15, automatic selection of an optimum data recovery procedure is facilitated by a host computer system 54 operating in cooperation with the data storage system 20. As discussed previously with respect to FIGS. 9 and 10, the host computer system 54 preferably encodes data-type information in a header field 114 associated with the particular type of data stored in the data field 116 at step 140. The data type information is written to the header field 114 and the associated data is written to the data field 116 at step 142. Alternatively, the host computer system 54 writes data into specified data bands demarcated for specific types of data at step 142. When retrieving data from the data storage disk 24, the header and data fields 114 and 116 are read, or alternatively, data-type information associated with the data band is correlated and determined, by the controller 58 at step 144.

In the event a read error is detected at step 146, the data recovery procedures and routines associated with the type of data stored in the data field 116 is determined at 148, and then executed at step 150 to rectify the read error for the particular type of data stored in the data field 116. The process of reading both the header and data fields 114 and 116 or data band identification for subsequent sectors is repeated again at step 144. It is noted that the optimization of the data recovery procedure as discussed with respect to FIGS. 9 and 15 necessarily requires that the additional data-type information be stored within the sector 52. As such, incorporation of the header field 114 into each sector 52 generally reduces the effective data storing capacity of the disk 24. In applications where a significant number of mixed data types are transferred to and from a data storage disk 24, however, the increase in data recovery processing efficiency resulting from inclusion of the header field 114 may justify the concomitant reduction in data storage capacity.

Alternatively, the controller 58 may include a look-up table or directory which maintains the address locations, data type information and associated data recovery procedures and/or routines for each data block or sector comprising the data storage disk 24. An additional header field 114 containing data-type information is thus not required, thereby providing a net increase the data storage capacity of the data storage disks 24. Upon the occurrence of a read error associated with a particular data block or sector, the controller preferably accesses the look-up directory to determine the type of data stored at the affected location or locations. An appropriate data recovery procedure or routine in accordance with the particular type of data stored at the affected location may then be performed.

It will, of course, be understood that various modifications and additions can be made to the embodiments discussed hereinabove without departing from the scope or spirit of the present invention. Accordingly, the scope of the present invention should not be limited by the particular embodiments discussed above, but should be defined only by the claims set forth below and equivalents of the disclosed embodiments.

What is claimed is:

1. A method of recovering data from a data storage device having a data storage disk for storing data, a transducer for transferring data to and from the disk, and a controller for coordinating the transfer of data to and from the disk, the disk including data, and the method of recovering data comprising the steps of:

providing the data storage device adapted for performing a plurality of data recovery procedures and comprising a selection switch coupled to the controller;

selecting a data recovery procedure from one of the plurality of data recovery procedures, the data recovery procedure being associated with a type of data further including the step of selecting a setting from a plurality of selection switch settings associated with the selected data recovery procedure;

detecting a read error in the data residing on the disk; and performing the selected data recovery procedure to correct the detected read error.

2. A method of recovering data from a data storage device having a data storage disk for storing data, a transducer for transferring data to and from the disk, and a controller for coordinating the transfer of data to and from the disk, the disk including data, and the method of recovering data comprising the steps of:

providing the data storage device adapted for performing a plurality of data recovery routines where the data storage device comprises a selection switch coupled to the controller;

selecting at least one data recovery routine from the plurality of data recovery routines, the at least one data recovery routine being associated with a type of data further including the step of selecting a setting from a plurality of selection switch settings associated with the selected data recovery routine;

detecting a read error in the data base residing on the disk; and performing the selected at least one data recovery routine to correct the detected read error.

* * * * *